United States Patent

Voigt et al.

[11] Patent Number: 5,908,802
[45] Date of Patent: Jun. 1, 1999

[54] NONAQUEOUS SOLUTION SYNTHESIS PROCESS FOR PREPARING OXIDE POWDERS OF LEAD ZIRCONATE TITANATE AND RELATED MATERIALS

[75] Inventors: James A. Voigt, Corrales; Diana L. Sipola; Bruce A. Tuttle, both of Albuquerque, all of N.M.; Mark T. Anderson, Woodbury, Minn.

[73] Assignee: Sandia Corporation, Albuquerque, N.M.

[21] Appl. No.: 08/960,943

[22] Filed: Oct. 30, 1997

[51] Int. Cl.$^6$ .............. C01G 1/02; C04B 35/46; C04B 35/453
[52] U.S. Cl. .............. 501/134; 501/135; 501/137; 501/138; 501/12; 252/62.9 R; 252/62.9 PT; 423/598; 423/593; 423/264
[58] Field of Search ................ 423/598, 593, 423/264; 252/62.9 PT, 62.9 R; 501/12, 134, 135, 137, 138

[56] References Cited

U.S. PATENT DOCUMENTS

| | | | |
|---|---|---|---|
| 4,019,915 | 4/1977 | Miyauchi et al. | 106/73.31 |
| 4,668,299 | 5/1987 | Nanao et al. | 423/593 |
| 4,696,810 | 9/1987 | Shirasaki et al. | 423/593 |
| 4,874,598 | 10/1989 | Oda et al. | 423/598 |
| 5,072,035 | 12/1991 | Chen et al. | 252/62.9 R |
| 5,091,348 | 2/1992 | Woodhead et al. | 501/136 |
| 5,096,642 | 3/1992 | Shirasaki | 252/62.9 R |
| 5,180,699 | 1/1993 | Terada et al. | 501/134 |
| 5,196,388 | 3/1993 | Shyu | 501/134 |
| 5,229,101 | 7/1993 | Watanabe et al. | 423/593 |
| 5,578,539 | 11/1996 | Glaubitt et al. | 501/137 |
| 5,783,165 | 7/1998 | Wilson et al. | 501/137 |

OTHER PUBLICATIONS

Sangeeta d. Ramamurthi and David A. Payne, *Strucutral Investigations of Prehydrolyzed Precursors Used in the Sol–Gel Processing of Lead Titanate*, J. Am. Ceram. Soc., 73(8) 2547–51(1990) no month.

G. H. Haertling and C. E. Land, *Recent Improvements in the Optical and Electrooptic Properties of PLZT Ceramics*, Ferroelectrics, 1972, vol. 3, pp. 269–280; IEEE Trans. Sonics & Ultrasonics, 1972, SU–19, pp. 269–280 no month.

*Primary Examiner*—Melissa Koslow
*Attorney, Agent, or Firm*—Elmer A. Klavetter

[57] ABSTRACT

A process for producing powders of perovskite-type compounds which comprises mixing a metal alkoxide solution with a lead acetate solution to form a homogeneous, clear metal solution, adding an oxalic acid/n-propanol solution to this metal solution to form an easily filterable, free-flowing precursor powder and then calcining this powder. This process provides fine perovskite-phase powders with ferroelectric properties which are particularly useful in a variety of electronic applications.

19 Claims, 4 Drawing Sheets

NONAQUEOUS SOLUTION SYNTHESIS PROCESS FOR PREPARING OXIDE POWDERS OF LEAD ZIRCONATE TITANATE AND RELATED MATERIALS

This invention was made with Government support under Contract No. DE-AC04-94AL85000 awarded by the Department of Energy. The Government has certain rights in the invention.

BACKGROUND OF THE INVENTION

The present invention generally relates to a process for producing a powder of perovskite-type ferroelectric materials and more particularly to a solution precipitation process for producing perovskite-type ferroelectric precursor powders, the calcined ferroelectric powder, and subsequent sintered ferroelectric materials.

Both dry and wet processes are conventionally known for producing perovskite-type $ABO_3$ oxide powders, such as lead zirconate titanate, PZT, $[Pb(Zr_{1-x}Ti_x)O_3, 0, <x<1$; where $A=Pb$ and $B=Zr,Ti]$. The most common method for preparing these ferroelectric materials is a dry process by mixing the individual oxide forms of the constituents (e.g., for PZT: $PbO_1$ $TiO_2$, and $ZrO_2$) in the desired ratio. The mixture is then heated in a process known as calcination to convert the constituent oxides into the desired perovskite phase. The perovskite phase is formed by the thermally induced diffusion and reaction of the component oxides to form the more thermodynamically stable complex oxide phase. For example, Terada et al, U.S. Pat. No. 5,180,699, issued on Jan. 19, 1993, describe a 2-stage calcination process for making $PbA_xNb_{1-x}O_3$, wherein a dried mixture of metals is mixed with a niobic acid sol and calcined at a temperature of 400–900° C., adding a Pb compound and again calcining the resulting mixture.

In the dry process, it is difficult to obtain a powder material having a uniform composition and the powder material obtained may contain unwanted phases such as pyrochlore phases, zircona, titania, and lead oxide whose dielectric properties are inferior to the desired perovskite phase. To reduce the amount of unwanted phases and increase the desired perovskite phase which exhibits ferroelectric characteristics, higher calcination temperatures are used, causing the powder material to coarsen by formation of hard agglomerates due to partial sintering. Further crushing and mixing are then required to obtain fine-particle material necessary for many applications. The step of recrushing and remixing not only increases the manufacturing cost but also reduces the reliability of the final product by letting impurities get into the calcined product.

Because of the difficulty in controlling compositional homogeneity, powder particle size, and the uniform incorporation of low level dopants by the method, alternate methods of powder preparation have been developed. The alternate methods are wet processes that have been developed based on the use of solutions containing some or all of the A-site and B-site components of the oxide to be prepared. The solution approach allows for better mixing of the constituents, less dependence on the source of the constituents, and the possibility of producing a much finer powder with more uniform properties.

The wet process is often a coprecipitation method in which a mixed solution of all of the components which constitute the desired perovskite phase is prepared, a precipitate-forming liquid such as an alkali is added for effecting coprecipitation, and the precipitate is separated out, dried and calcined. The solutions utilized in the wet process can be aqueous or nonaqueous solutions as well as sol-gels and slurries. This type of processing can lead to the production of fine powders that do not require additional crushing and grinding.

Oda et al., U.S. Pat. No. 4,874,598, issued on Oct. 17, 1989, and Watanabe et al., U.S. Pat. No. 5,229,101, issued on Jul. 20, 1993, describe an aqueous solution method of producing a perovskite-type oxide of the $ABO_3$.

Miyauchi et al, U.S. Pat. No. 4,019,915, issued on Apr. 26, 1977, describe a slurry method of preparing perovskite-type materials with the general formula $ABO_3$ by taking a solid solution of A, dispersing the elements of component B into the solution, admixing oxalic acid in the presence of an alcohol to form a precipitate, adjusting the pH of the slurry to complete the precipitation process, drying the precipitate into a powder, calcining the powder and molding the powder under pressure.

Woodhead et al., U.S. Pat. No. 5,091,348, issued on Feb. 25, 1992, describe a sol-gel method of making a perovskite-type structure by mixing non-alkoxide sols with a metal salt, dehydrating the mixed sol to form a gel, and heating to form a perovskite-type product that can be comminuted.

Haertling and Land (Ferroelectrics, 1972, Vol. 3, pp. 269–280) describe a sol-gel method of making perovskite-type materials by mixing alkoxide solutions of zirconium and titanium with a lead oxide powder and lanthanum acetate solution, hydrolyzing the solution to form a white-colored solution slurry of paint-like consistency, drying the slurry, crushing the dried product, calcining the product and then crushing and calcining again to obtain a fine-grained powder product.

Ramamurthi and Payne (J. Am. Ceram. Soc., 1990, 73, 2547) describe a sol-gel method for making PT and PZT materials using alkoxides and acetates prepared in a methoxyethanol solvent system. The processing requires several hours as well as multiple processing steps to get the metal compounds in solution. These steps include refluxing at elevated temperature and hydrolysis.

Although a wet process synthesis approach for producing perovskite-type powders offers many potential advantages, there are often increased costs related to its use. The precursor chemicals used are often more expensive than the traditionally used metal oxides. Additional up-front processing steps are required to prepare solutions. Liquid wastes are generated that must be dealt with. Also, depending on the material being prepared and the precursor solutions used, large diameter particles are often obtained as the particles tend to coagulate during the formation of precipitate, drying or calcination. When this occurs, the method generally requires that the product be crushed and mixed again to produce the necessary fine, homogeneous particles before they are molded and sintered. The step of recrushing and remixing not only increases the manufacturing cost but also reduces the reliability of the final product by letting impurities get into the calcined product.

The need for perovskite-type $ABO_3$ oxide powders with tightly controlled physical and chemical properties for use in preparing high quality electronic ceramics has led to the development of these various solution synthesis routes to powders with their various shortcomings and drawbacks.

It would be more desirable, for the routes based on precipitation, to have a process that is simple with respect to the number of solutions that need to be mixed to form the precipitate. In such a process, one solution could contain all of the A and B components of the oxide to be produced and a second solution could contain a precipitant. Mixing of the two solutions could quantitatively remove the A and B solution species without the addition of a third solution, for example, to adjust pH. The precipitate product would be readily filterable and require little or no washing before drying. The dried precipitate powder would be easily converted by calcination to the desired perovskite phase at moderate temperatures where subsequent comminution and calcination steps are not required. The resulting oxide powder would be phase pure and reactive to sintering for subsequent formation of ferroelectric ceramic materials. Such a process is realized in the present invention.

SUMMARY OF THE INVENTION

According to the present invention, a solution synthesis method is provided for the preparation of perovskite-type $ABO_3$ metal-oxide powders by a simple, nonaqueous solution route wherein all of the A-site and B-site component elements are dissolved in one solution, thereby eliminating dependence on precursor morphology and promoting uniform mixing, and producing a readily filterable precipitate that requires no washing before conversion to the oxide phase. By using the solution-precipitation method of the present invention, the amount of powder prepared per unit volume of liquids used is maximized and waste generation minimized and the process quantitatively removes A-site and B-site cation component elements without pH adjustment or the need for a third solution, so that powder stoichiometry and homogeneity can be tightly controlled.

It is an object of the present invention to provide a novel method for making a perovskite-type metal-oxide powder, comprising the steps of preparing a first solution by solubilizing in a first solvent at least one compound containing a metal cation selected from the group consisting of lead, lanthanum, magnesium, barium, copper and bismuth, preparing a second solution by solubilizing in a second solvent at least one alkoxide containing a metal cation selected from the group consisting of zirconium, titanium, niobium, lanthanum, and tin, mixing the first and second solution to produce a homogenous, third solution, mixing a solution of acid in an alcohol with the third solution to form a two-phase mixture containing a solid precipitate and liquid, wherein the acid is selected from a group consisting of oxalic acid or oxalic acid dihydrate, separating the precipitate from the liquid, drying the precipitate to form a precursor powder, and calcining the precursor powder to form the perovskite-type metal-oxide powder.

It is another object of the invention that the recovery in the precursor powder of the initial weight of metal cations in the third solution is over 98%.

It is another object of the invention to produce a ferroelectric ceramic material by sintering the perovskite-type powder.

BRIEF DESCRIPTIONS OF THE DRAWINGS

DETAILED DESCRIPTION OF THE INVENTION

The most widely studied class of ferroelectric materials is based on the perovskite crystal structure of the lead zirconate titanate [$Pb(Zr_{1-x},Ti_x)O_3$; PZT] family. PZT is an abbreviation for lead zirconate titanate, a ferroelectric material in the crystalline form. PT, lead titanate, is also a ferroelectric material. Various cations can be substituted for elements in the PZT precursor material to form other ferroelectric materials. Lanthanum and barium, A-site cations, can be substituted for lead, another A-site cation. Niobium, bismuth, magnesium, copper, and tin can substitute for either of the B-site cations zirconium or titanium. Therefore, for example, lanthanum or barium can be added to produce PLZT or PBZT, respectively. Niobium can be added to the general PZT precursor material to form a PNZT precursor material. Alternatively, tin, bismuth, magnesium, and copper can be added to a PZT precursor material. With the present invention, any combination of the described metal cations can be substituted for lead, zirconium, and titanium to produce a ferroelectric material.

The quantity of starting compounds used in the synthesis of the PZT family of ferroelectric materials is dependent upon the desired characteristics of the product ferroelectric material. For ferroelectric materials, the total number of A site cations and B site cations must be equal. With the total of lead, barium, and lanthanum A-site cations designated as 100, the ratio of the B-site cations for Nb, Sn, Zr, Bi, Mg, Cu, and Ti material must also add up to 100. The stoichiometry of any particular ferroelectric material composition is expressed by the relative quantity of metal cations in the resulting product. For example, the expression $Pb_{0.996}Nb_{0.018}(Zr_{0.95}Ti_{0.05})_{0.982}O_3$ can be expressed as PNZT 95/5, indicating that the ratio of zirconium to titanium atoms is 95:5.

Figure 1:
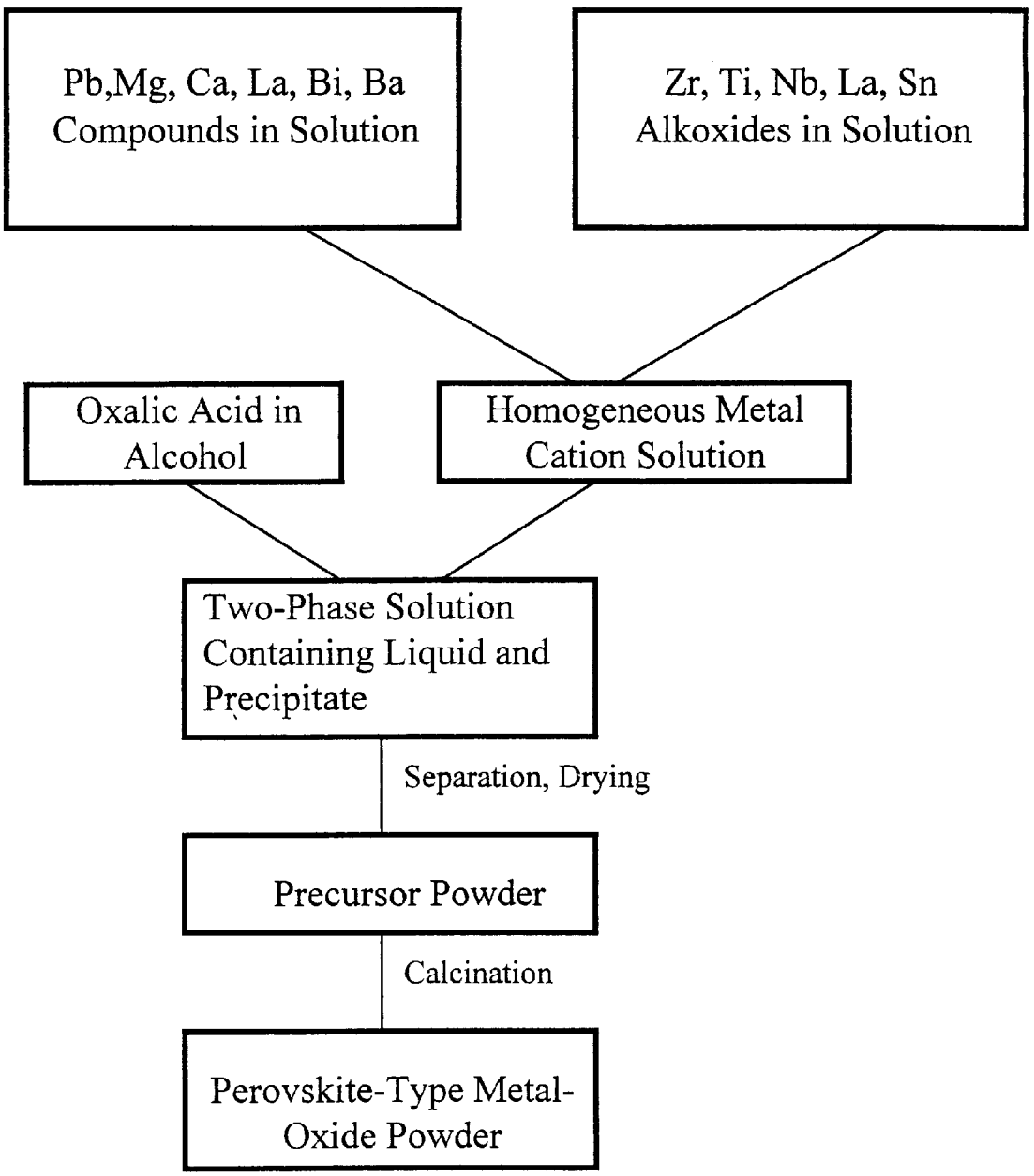
FIG. 1 shows the general solution synthesis method for the PNZT 95/5 of perovskite-type ferroelectric powders.

The general synthesis method or process to generate the precursor solution and subsequent ferroelectric powder material is illustrated in FIG. 1. This is a generic solution preparation method for all of the discussed ferroelectric materials, with the amounts of the starting lead, barium, zirconium, titanium, copper, bismuth, lanthanum, magnesium, tin, and niobium materials able to be varied to achieve any desired precursor solutions and subsequent perovskite-type ferroelectric powder. The stoichiometry of the starting materials is chosen to produce a powder material with the desired amount of metals. The invention provides a method for precisely controlling powder stoichiometry. Importantly, with the method of the present invention, essentially all of the A-site and B-site cations quantitatively go into the product, with approximately greater than 98% recovery for any combination of metal cations. Once the precursor solution has been prepared, a precursor powder may be obtained by separating the precipitated solid from the liquid solution. This solid precipitate is then converted from the metallo-organic species to the mixed-metal oxide, ferroelectric powder material by calcination. This powder can then be converted to a ceramic material by sintering. This process forms the perovskite phase of the material which is required for the material to be a suitable ferroelectric material.

According to the present invention, as illustrated in FIG. 1, a first solution is prepared by mixing non-alkoxide compounds containing the metal cations desired in the final powder product where the non-alkoxide, metal-containing compounds are oxides or acetates of lead, lanthanum, magnesium, barium, bismuth, or copper. The metal-containing compounds are dissolved in glacial acetic acid to form a highly concentrated acetate solution. A second solution is prepared by mixing the alkoxides of the desired metal cations: zirconium, lanthanum, titanium, niobium, and tin. The n-butoxides are commonly used because of their relative stability to hydrolysis, although ethoxides or propoxides can also be used. Acetic acid is added to this mixture to promote complexation between the different metal cation species and to make the solution compatible with the first solution. The precursor chemicals are precisely assayed by gravimetric and spectroscopic techniques. By careful weighing during solution preparation, the ratio of the different constituents in the final powder material can be precisely controlled since the precipitation step of the invention in general removes >98% of each of the components during the precipitation step. A slight excess of lead can be used to account for lead volatility during calcination and sintering. The first solution containing the non-alkoxide compounds is mixed with the second solution containing the alkoxide compounds to form a homogeneous, clear solution containing all of the A-site and B-site metal cations in the desired ratio. Extensive experimentation has shown that addition of an acid, preferably acetic acid, to the alkoxide mixture is most preferred to maintain a single-phase, homogeneous solution when the two solutions are mixed.

This homogeneous clear solution is mixed with a solution of oxalic acid or oxalic acid dihydrate in an alcohol. Experimentation showed that alcohols such as methanol, ethanol, isopropanol, or n-propanol were preferred to maintain a stable solution. The oxalic acid or oxalic acid dihydrate solution in alcohol is preheated to approximately 30 to 50° C. A slight molar excess of oxalic acid (approximately 15–20%) was used relative to the number of equivalents required to form a simple AB oxalate [3 moles of $C_2O_4^{2-}$/(1 mole of $A^{2+}$+1 mole of $B^{4+}$)=stoichiometric]. Mixing of the solutions caused a precipitation reaction where precipitation of the metal oxalates was essentially instantaneous. After stirring the precipitate in solution, the precipitate was separated from the supernatant liquid. Because of the physical properties of the precipitate, the separation may be accomplished by simple vacuum filtration using medium frit sintered glass funnels, although other methods, such as centrifugation can be used. The precipitate filters quickly. For example, three liters of precipitate mother liquor could be filtered (using a three liter filter funnel) in 15 minutes. The precipitate filter cakes are dried at approximately 70 to 90° C. The resulting dried powder is free flowing.

The completeness of the precipitation process with respect to the quantitative removal of A-site and B-site component species was determined by analysis of process filtrates. Aliquots of the filtrates were evaporated to dryness. The remaining nonvolatile species were redissolved in water. The aqueous solutions were analyzed quantitatively for the presence of A-site and B-site species using inductively coupled plasma atomic emission spectroscopy, ICPAES. From the values found, the total amount of unprecipitated A- and B-site species were calculated by the multiplying the grams of filtrate collected by the ICPAES-determined mass of each component per gram filtrate. The amount of each component precipitated was then found by doing a mass balance on amount of each component in the starting solutions and the amount found unprecipitated in the filtrate. In general, for the different systems investigated, greater than 98 percent of each component was removed from solution by the precipitation step.

Figure 2:
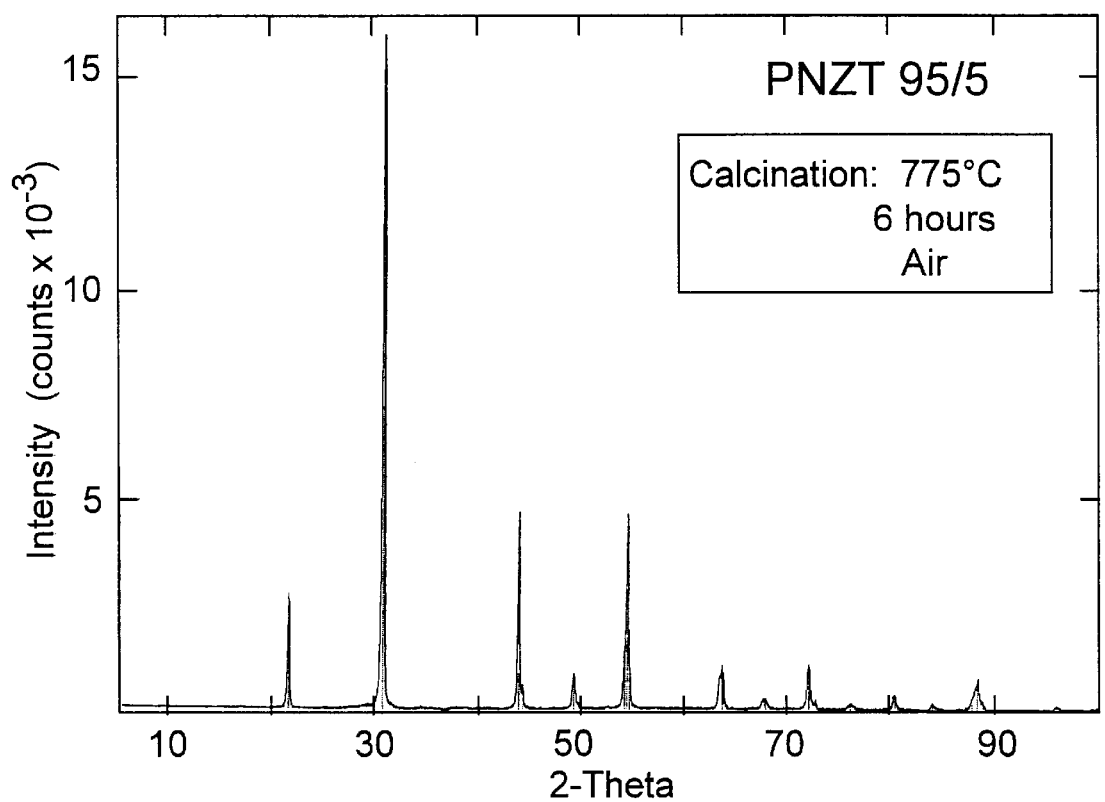
FIG. 2 shows a typical x-ray diffraction pattern for a prepared PNZT 95/5 powder demonstrating that the perovskite-phase was prepared.
Figure 3:
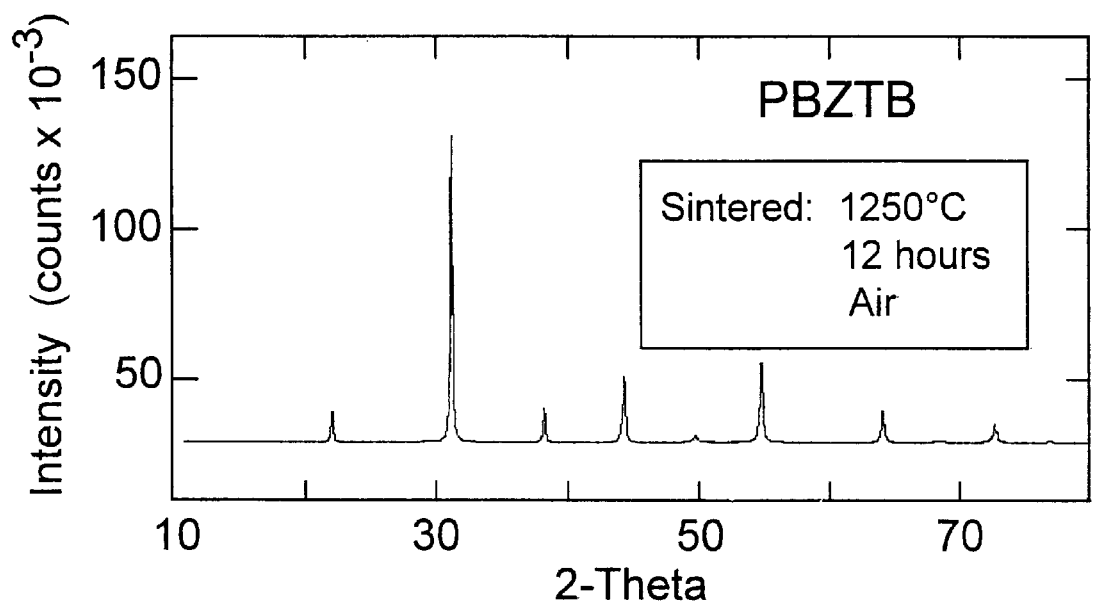
FIG. 3 shows a typical x-ray diffraction pattern for a prepared and sintered PBZTB demonstrating that the perovskite-phase was prepared.

The oxalate coprecipitate was converted by calcination in air to the perovskite structure at final temperatures greater than approximately 600° C. Thermal gravimetric analysis showed that the weight loss associated with decomposition was complete by 600° C. X-ray powder diffraction indicated that a phase pure perovskite phase is formed after a heat treatment at 775° C. for 6 hours in air, as depicted in FIGS. 2 and 3.

The powders are converted into ceramic form by simple ceramic processing operations. Powders either with or without a binder added can be compacted using uniaxial and/or isostatic means using pressures ranging from 10,000 to 30,000 pounds per square inch. The powder compacts are then converted to bulk ceramic form by sintering at temperatures from approximately 1000° C. to 1350° C. In order to prevent lead loss from lead-containing formulations, generally the objects are placed in a covered crucible containing a lead-containing powder.

EXAMPLES

Example 1

Preparation of a Pb-Cation-Containing Solution

Yellow PbO powder was dissolved in glacial acetic acid. For the preparation of a 1.5 kilogram batch of $Pb_{0.996}Nb_{0.018}$ $(Zr_{0.95}Ti_{0.05})_{0.982}O_3$, PNZT, 978.81 g of PbO and 1266.67 g of glacial acetic acid were used. To prepare this solution, a 4 liter kettle was charged with all of the dry PbO powder. The glacial acetic acid was slowly added to the kettle with the evolution of much heat and vapor. After the bubbling subsided, additional acid was added and the skeletal yellow PbO cake was broken up. The acid was added in 4 or 5 aliquots over the course of about 30 minutes. The cake was slowly broken up into small pieces. The solution was stirred under nitrogen at 50–90 rpm with an overhead stirrer for several hours to dissolve all of the yellow lead. The solution was reddish in color indicating the presence of trace amounts of undissolved red lead oxide, $Pb_3O_4$. This was dissolved by the addition of a few milliliters of acetyl acetone. For this example, 4.5 ml of acetyl acetone was added. This process yielded a stable, clear pinkish solution.

Example 2

Lead Niobate Zirconate Titanate, PNZT 95/5

Figure 4:
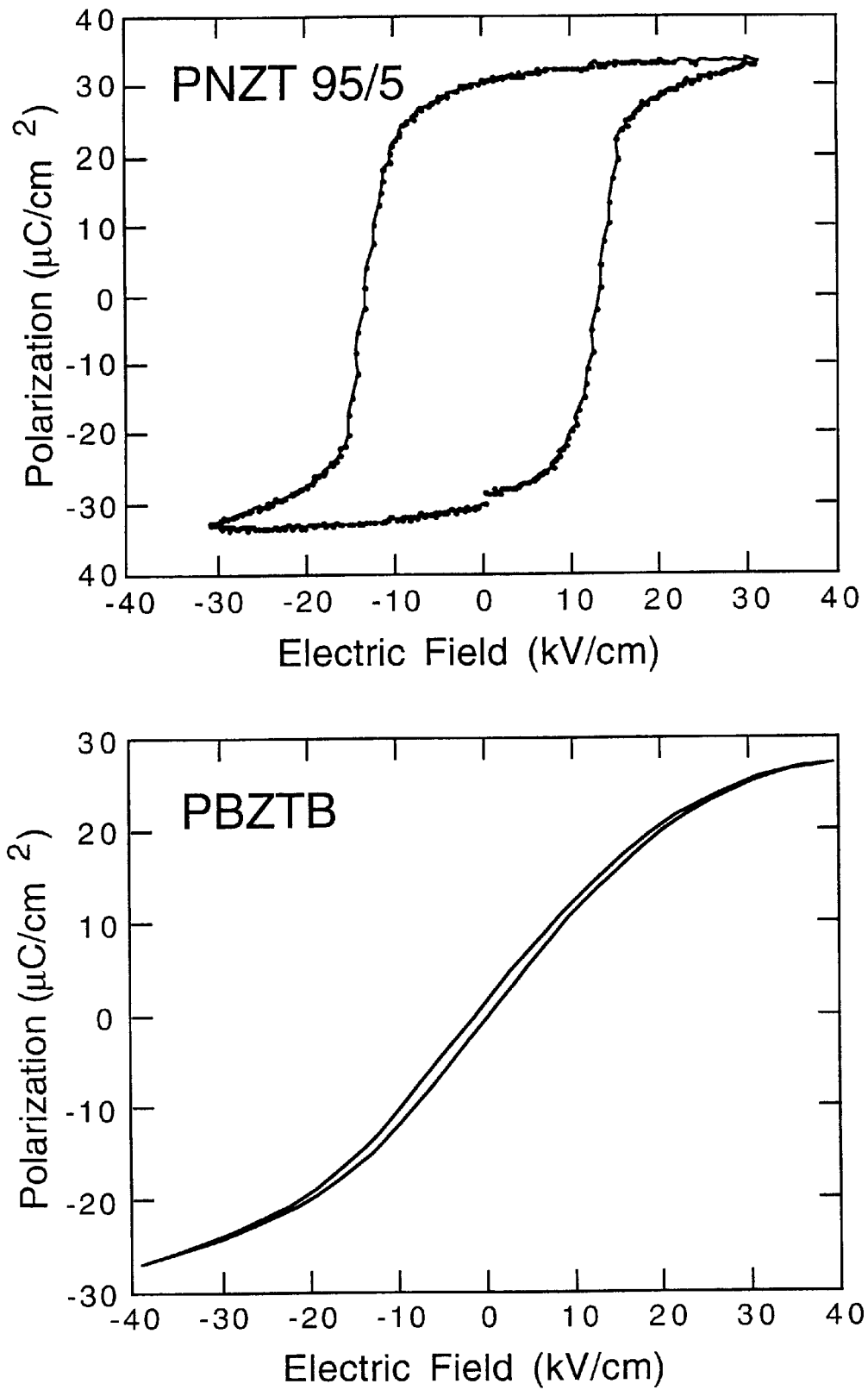
FIG. 4 shows typical hysteresis curves for prepared PNZT 95/5 and PBZTB materials, demonstrating that ferroelectric properties are achieved.

Numerous batches of PNZT were prepared in 1.5 kg batch sizes. A typical composition used was $Pb_{0.996}Nb_{0.018}$ $(Zr_{0.95}Ti_{0.05})_{0.982}O_3$ where lead is batched at a 0.5% molar excess relative to stoichiometric. In this 1.5 kg batch example, 1877.9 g Zr n-butoxide (assay value=0.203 g Zr/g Zr n-butoxide), 64.96 g Ti n-butoxide (assay value=0.141 g Ti/g Ti n-butoxide), and 35.35 g Nb n-butoxide (assay value=0.205 g Nb/g Nb n-butoxide), were reacted with 264.43 g glacial acetic acid for 5 minutes before being added to a Pb acetate solution containing 4.3855 moles Pb prepared as described in Example 1. This metals solution was mixed with an overhead stirrer for 33 minutes under an $N_2$ purge. It was pumped into a 25 liter stirred vessel containing a solution of 1607.9 g of anhydrous oxalic acid dissolved in 6583 g n-propanol at 48° C. over 17 minutes. The modes of agitation for the precipitation reaction were an overhead stirrer utilizing a 10 inch wide U-shaped paddle stirrer as well as a shear mixer. Upon completion of the metals solution addition, both the shear mixer and the external heat source were turned off. The slurry experienced an exothermic temperature increase of 7° C. during stirring. After 90 minutes, the slurry was transferred to medium frit glass filter funnels, allowed to settle 5–8 minutes, vacuum filtered over 15–20 minutes, and the resulting filter cake was dried at 80 to 87° C. for 195 hours. The dried powder was calcined for 6 hours at ~400° C. followed by 16 hours at ~900° C. to form the desired PNZT 95/5 phase. The percent recovery of components during precipitation was 100.00% for Pb, 99.84% for Nb, 100.00% for Zr, and 99.85% for, Ti. A typical X-ray diffraction pattern for a prepared and calcined PNZT 95/5 powder is shown in FIG. 2. The ferroelectric hysteresis properties for a prepared PNZT 95/5 ceramic is shown in FIG. 4.

Example 3

Lead Zirconate, PZ

A 75 g batch of lead zirconate, PZ, was prepared with the composition of $Pb_{1.03}ZrO_3$. A Pb acetate solution (102.69 g of a 0.00213 mol Pb/g solution; prepared as described in Example 1) and a Zr n-butoxide/acetic acid solution (98.91 g Zr n-butoxide, 0.204 g Zr/g Zr n-butoxide, plus 12.77 g glacial acetic acid) were mixed for 37 minutes. This solution was pumped at 40 ml/minute into a solution of 69.48 g of anhydrous oxalic acid dissolved in 397 g of n-propanol at 49° C., with agitation supplied by a magnetic stir bar, manual stirring with a stir rod, as well as shear mixing. The slurry was stirred for 100 minutes, transferred to a medium frit glass filter funnel, and vacuum filtered. The wet filter cake was dried at 89° C. for 44 hours. The dried powder was calcined at 775° C. for 15.3 hours to form the desired perovskite $PbZrO_3$ phase.

Example 4

Lead Niobate Zirconate Titanate, PNZT 52/48

A 1.5 kg batch of PNZT 52:48 was prepared with the composition of $Pb_{1.0473}Nb_{0.024}(Zr_{0.52}\ Ti_{0.48})_{0.976}O_3$. For this batch, 1089.0 g Zr n-butoxide (assay value=0.203 g Zr/g Zr n-butoxide), 748.6 g Ti n-butoxide (assay value=0.140 g Ti/g Ti n-butoxide), and 50.8 g Nb n-butoxide (assay value= 0.205 g Nb/g Nb n-butoxide), were reacted with 281.91 g glacial acetic acid for 5 minutes before being added to a Pb acetate solution containing 4.9154 moles Pb prepared as described in Example 1. This metals solution was mixed with an overhead stirrer for 30 minutes under an $N_2$ purge. It was pumped into a 25 liter stirred vessel containing a solution of 1713.9 g of anhydrous oxalic acid dissolved in 7018 g n-propanol at 50° C. over 16.5 minutes. The modes of agitation for the precipitation reaction were an overhead stirrer utilizing a 10 inch wide U-shaped paddle stirrer as well as a shear mixer. Upon completion of the metals solution addition, both the shear mixer and the external heat source were turned off. The slurry experienced an exothermic temperature increase of 4° C. during stirring. After 90 minutes, the slurry was transferred to medium frit glass filter funnels, allowed to settle 11–15 minutes, vacuum filtered, and the resulting filter cake was dried at 88° C. for 137 hours. The dried powder was calcined for 16 hours at ~400° C. followed by 16 hours at ~770° C. to form the desired PNZT 52/48 phase.

Example 5

Lead Barium Zirconate Titanate/Bismuth, PBZTB

An 80 g batch of PBZTB was prepared with the composition of $(Pb_{0.71}Ba_{0.29})_{0.99}(Zr_{0.707}Ti_{0.293})_{0.98}Bi_{0.02}O_3$. For this batch, 92.31 g Zr n-butoxide (assay value=0.203 g Zr/g Zr n-butoxide) and 28.34 g Ti n-butoxide (assay value= 0.140 g Ti/g Ti n-butoxide) were reacted with 17.1 g glacial acetic acid for 6 minutes before being added to a Pb—Ba—Bi acetate/acetic acid solution. The Pb—Ba—Bi solution was prepared by mixing 98.44 g of Pb acetate solution (0.00208 mol Pb/g solution, prepared as described in Example 1) with 86.1 g of glacial acetic acid, 2.26 Bi acetate, and 21.35 g of Ba acetate. The Pb—Ba—Bi—Zr—Ti solution was mixed for 4 minutes, and then poured quickly into a solution containing 106.3 g oxalic acid (anhydrous) dissolved in 488 g n-propanol with agitation provided by a stir bar as well as manual stirring with a spatula. The slurry was stirred for about 1.2 hours, transferred to a medium frit glass filter funnel and vacuum filtered. The wet filter cake was dried at 87° C. for 90.5 hours. The dried powder was calcined at 400° C. for 16 hours followed by 8 hours at 700° C. A typical X-ray diffraction pattern for a prepared PBZTB after sintering at 1250° C. is shown in FIG. 3. . The ferroelectric hysteresis properties for a prepared PBZTB ceramic is shown in FIG. 4.

Example 6

Lead Magnesium Niobate Titanate/Cu, PMNTC

A 25 g batch of PMNTC was prepared with the composition $Pb_{1.03}Mg_{0.3147}Nb_{0.6293}Ti_{0.05}Cu_{0.006}O_3$. For this batch, 36.10 g of a lead acetate solution (0.002158 mol Pb/g solution, prepared as described in Example 1), was mixed with 5.104 g of Mg acetate, 0.091 g of Cu acetate monohydrate, and 19.1 g glacial acetic acid. The Ti—Nb solution was prepared by mixing 1.462 g Ti n-butoxide (assay value=0.141 g Ti/g Ti n-butoxide), and 23.90 g Nb n-butoxide (assay value=0.204 g Nb/g Nb n-butoxide), and 10.36 g glacial acetic acid for 1.2 hours. A 32.14 g aliquot of the Ti—Nb solution was added to the Pb—Cu—Mg solution and allowed to mix for 15 minutes. The Pb—Mg—Nb—Ti—Cu solution was rapidly poured into a warm solution containing 49.4 g oxalic acid (dihydrate) dissolved in 96 g n-propanol. The resulting slurry was stirred for 2 hours, transferred to a medium frit glass filter funnel and vacuum filtered. The wet filter cake was dried at 90° C. for 89 hours. The dried powder was calcined at 500° C. for 4 hours followed by 3 hours at 700° C. The percent recovery of components during precipitation was 99.1% for Nb and 99.6% for Ti.

Example 7

Lead Magnesium Niobate/Lead Titanate PMN/PT

A 20 g batch of PMN/PT was prepared with the composition $Pb_{1.06}Mg_{0.1637}Nb_{0.3280}Ti_{0.5051}Cu_{0.0031}O_3$. For this batch, 29.06 g of a lead acetate solution (0.002235 mol Pb/g solution, prepared as described in Example 1), was mixed with 3.126 g of Mg acetate, 0.039 g of Cu acetate monohydrate, and 9.0 g glacial acetic acid. The Ti—Nb solution was prepared by mixing 11.07 g Ti n-butoxide (assay value=0.141 g Ti/g Ti n-butoxide), and 9.63 g Nb n-butoxide (assay value=0.204 g Nb/g Nb n-butoxide), and 7.72 g glacial acetic acid for 15 minutes. A 27.05 g aliquot of the Ti—Nb solution was added to the Pb—Cu—Mg solution and allowed to mix for 20 minutes. The Pb—Mg—Nb—Ti—Cu solution was rapidly poured into a 50° C. solution containing 31.1 g oxalic acid (dihydrate) dissolved in 77 g n-propanol. The resulting slurry was stirred for 1.5 hours, transferred to a medium frit glass filter funnel and vacuum filtered. The wet filter cake was dried at 50° C. for 168 hours. The dried powder was calcined for 3 hours at 700° C. The percent recovery of components during precipitation was 99.99% for Pb, 99.95% for Mg, 99.99% Nb and 99.99% for Ti.

Example 8

Sintering of Lead Magnesium Niobate/Lead Titanate PMN/PT

Powders are converted from the metallo-organic species from Examples 2 through 7 to the mixed-metal oxide ferroelectric material by sintering. Sintering can be done by ramping in a tube furnace under ambient atmosphere from room temperature to approximately 650° C. using a ramp rate of approximately 20° C./min and holding at about 650° C. for about 30 minutes.

The invention being thus described, it will be apparent to those skilled in the art that the same may be varied in many ways. Such variations are not to be regarded as a departure from the spirit and scope of the invention, and all such modifications are intended to be included within the scope of the following claims.

We claim:

1. A method for making a metal-oxide powder, comprising:

preparing a first solution by solubilizing in acetic acid at least one compound containing a metal cation selected from the group consisting of lead, bismuth, barium, lanthanum, copper, and magnesium;

preparing a second solution by solubilizing in a second solvent at least one alkoxide containing a metal cation selected from the group consisting of zirconium, titanium, niobium, lanthanum and tin;

mixing the first and second solution to produce a homogenous, third solution;

mixing a solution of acid in an alcohol with the third solution to form a two-phase mixture containing a solid precipitate phase and a liquid phase wherein the acid is selected from the group consisting of oxalic acid or oxalic acid dihydrate;

separating the precipitate phase from the liquid phase;

drying the precipitate phase to form a precursor powder; and calcining the precursor powder to form the metal-oxide powder.

2. The method according to claim 1 wherein the compounds containing the metal cation are selected from the group consisting of metal oxides and metal acetates.

3. The method according to claim 1 wherein the alcohol is selected from the group consisting of methanol, ethanol, n-propanol and isopropanol.

4. The method according to claim 1, wherein separating the precipitate is performed by vacuum filtration.

5. The method according to claim 1, wherein drying the precipitate is performed at approximately 70 to 90° C.

6. The method according to claim 1, wherein calcining was performed at temperatures greater than approximately 600° C.

7. The method according to claim 1, wherein the recovery in the precursor powder of the initial weight of metal cations in the third solution is over 98%.

8. The method according to claim 1, further comprising the step of compacting and sintering said powder.

9. The method according to claim 8, wherein the sintering is done by heating the powder under ambient atmosphere at temperatures between approximately 1000° C. to approximately 1350° C.

10. A method for making a metal-oxide powder, comprising:

preparing a first solution by solubilizing in acetic acid at least one compound containing a metal cation selected from the group consisting of lead, bismuth, barium, lanthanum, copper, and magnesium;

preparing a second solution by solubilizing in acetic acid at least one alkoxide containing a metal cation selected from the group consisting of zirconium, titanium, niobium, lanthanum and tin;

mixing the first and second solution to produce a homogenous, third solution;

mixing a solution of acid in an alcohol with the third solution to form a two-phase mixture containing a solid precipitate phase and a liquid phase wherein the acid is selected from the group consisting of oxalic acid or oxalic acid dihydrate;

separating the precipitate phase from the liquid phase;

drying the precipitate phase to form a precursor powder; and calcining the precursor powder to form the metal-oxide powder.

11. A method for making a metal-oxide powder, comprising:

preparing a first solution by solubilizing in a first solvent at least one compound containing a metal cation selected from the group consisting of lead, bismuth, barium, lanthanum, copper, and magnesium;

preparing a second solution by solubilizing in acetic acid at least one alkoxide containing a metal cation selected from the group consisting of zirconium, titanium, niobium, lanthanum and tin;

mixing the first and second solution to produce a homogenous, third solution;

mixing a solution of acid in an alcohol with the third solution to form a two-phase mixture containing a solid precipitate phase and a liquid phase wherein the acid is selected from the group consisting of oxalic acid or oxalic acid dihydrate;

separating the precipitate phase from the liquid phase;

drying the precipitate phase to form a precursor powder; and calcining the precursor powder to form the metal-oxide powder.

12. The method according to claim 11 wherein the compounds containing the metal cation are selected from the group consisting of metal oxides and metal acetates.

13. The method according to claim 11 wherein the alcohol is selected from the group consisting of methanol, ethanol, n-propanol and isopropanol.

14. The method according to claim 11, wherein separating the precipitate is performed by vacuum filtration.

15. The method according to claim 11, wherein drying the precipitate is performed at approximately 70 to 90° C.

16. The method according to claim 11, wherein calcining was performed at temperatures greater than approximately 600° C.

17. The method according to claim 11, wherein the precursor powder has a recovery rate of the initial weight of metal cations in the third solution of over 98%.

18. The method according to claim 11, further comprising the step of compacting and sintering said powder to produce a ferroelectric, ceramic material.

19. The method according to claim 18, wherein the sintering is done by heating the powder under ambient atmosphere at temperatures between approximately 1000° C. to approximately 1350° C.

* * * * *